(12) United States Patent
Cassagne et al.

(10) Patent No.: US 9,399,520 B2
(45) Date of Patent: Jul. 26, 2016

(54) ASSEMBLY COMPRISING AN ARTICULATION SPINDLE SUPPORTED BY A CLEVIS AND IMMOBILIZED IN TRANSLATION BY A BLOCKING DEVICE INTEGRATING A DOUBLE ANTI-ROTATION SYSTEM

(71) Applicant: Airbus Operations (SAS), Toulouse (FR)

(72) Inventors: Jerome Cassagne, Toulouse (FR); Thomas Deforet, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 50 days.

(21) Appl. No.: 14/563,040

(22) Filed: Dec. 8, 2014

(65) Prior Publication Data
US 2015/0166191 A1    Jun. 18, 2015

(30) Foreign Application Priority Data

Dec. 12, 2013    (FR) ...................................... 13 62485

(51) Int. Cl.
| B64D 27/26 | (2006.01) |
| F16B 39/10 | (2006.01) |
| F16C 11/04 | (2006.01) |
| F16C 23/04 | (2006.01) |

(52) U.S. Cl.
CPC ................ *B64D 27/26* (2013.01); *F16B 39/10* (2013.01); *F16C 11/045* (2013.01); *F16C 23/045* (2013.01); *B64D 2027/262* (2013.01); *Y10T 403/32557* (2015.01)

(58) Field of Classification Search
CPC  B64D 27/26; B64D 2027/262; F16C 11/045; F16C 23/045; F46B 39/10
See application file for complete search history.

(56) References Cited

U.S. PATENT DOCUMENTS

| 3,592,421 A | 7/1971 | Kopp |
| 4,735,533 A | 4/1988 | Gallagher et al. |
| 4,943,013 A | 7/1990 | Kapala et al. |
| 2008/0232924 A1 | 9/2008 | Levert |

FOREIGN PATENT DOCUMENTS

| EP | 0357504 | 3/1990 |
| FR | 2891804 | 4/2007 |

OTHER PUBLICATIONS

French Search Report, Aug. 28, 2014.

*Primary Examiner* — Tien Dinh
*Assistant Examiner* — Richard R Green
(74) *Attorney, Agent, or Firm* — Greer, Burns & Crain Ltd.

(57) ABSTRACT

An assembly having an articulation spindle mounted in a first sleeve inserted into a first arm of a clevis and in a second sleeve inserted into a second arm of said clevis, and a blocking device. The blocking device comprises a nut screwed onto an extension of the second sleeve and comprising an inner shoulder acting as a stop for a second end of the articulation spindle, at least two locking washers engaging with the nut, a tab washer comprising an element immobilizing it in rotation with respect to the second arm of the clevis, and for each locking washer, a blocking element limiting the rotational movement of the locking washer with respect to the tab washer.

9 Claims, 5 Drawing Sheets

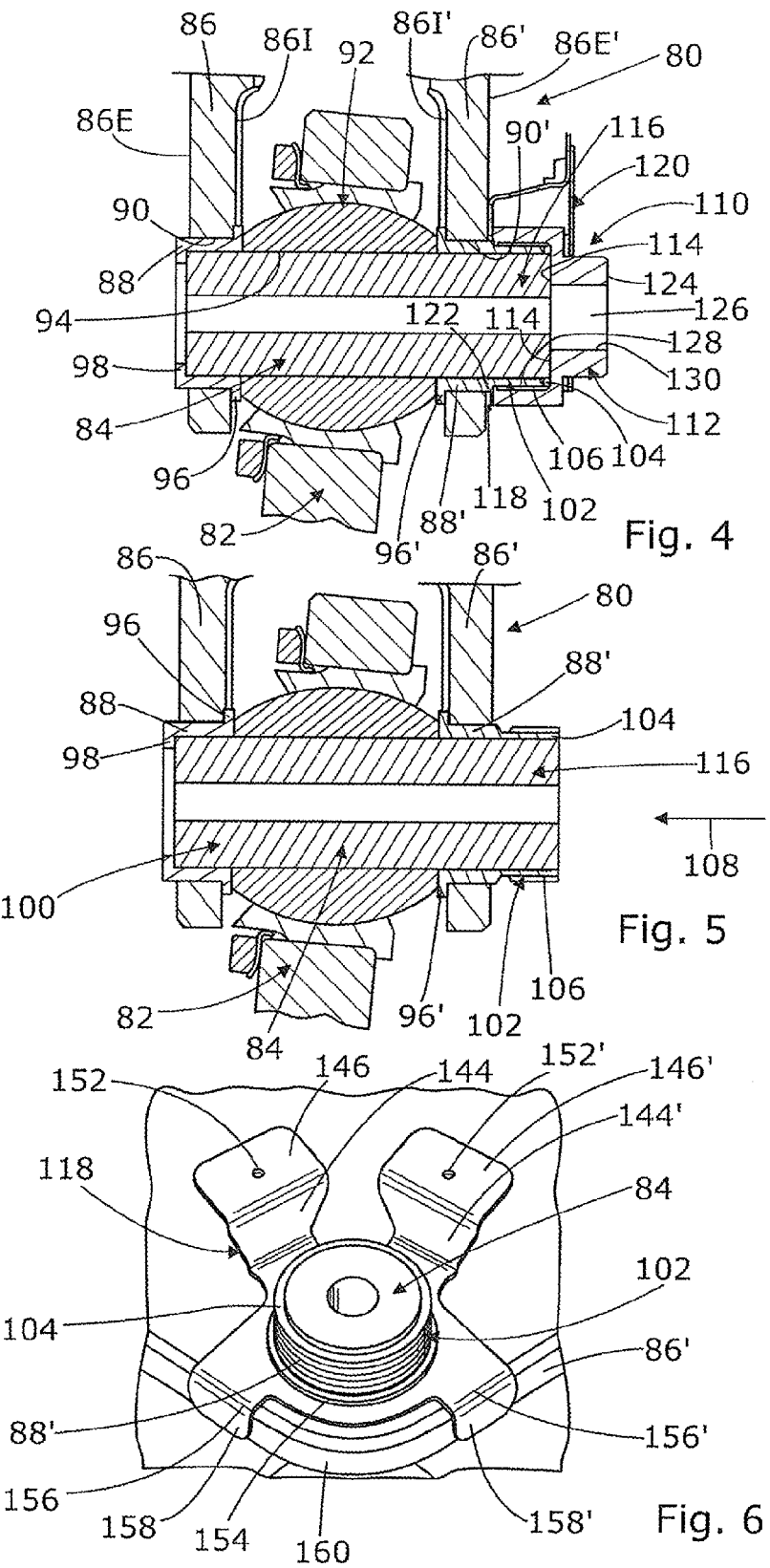

ASSEMBLY COMPRISING AN ARTICULATION SPINDLE SUPPORTED BY A CLEVIS AND IMMOBILIZED IN TRANSLATION BY A BLOCKING DEVICE INTEGRATING A DOUBLE ANTI-ROTATION SYSTEM

CROSS-REFERENCES TO RELATED APPLICATIONS

This application claims the benefit of the French patent application No. 1362485 filed on Dec. 12, 2013, the entire disclosures of which are incorporated herein by way of reference.

BACKGROUND OF THE INVENTION

The present invention relates to an assembly comprising an articulation spindle supported by a clevis and immobilized in translation by a blocking device integrating a double anti-rotation system.

In the field of aeronautics, according to one configuration shown in FIG. 1, a power plant 10 is connected to a wing 12 of an aircraft via an attachment pylon 14.

The attachment pylon 14 is connected to the wing 12 via fasteners 16, 16', at the front and at the rear of the attachment pylon. In parallel, the power plant 10 is connected to the attachment pylon 14 via fasteners 18, 18', at the front and at the rear of the power plant. The connection between the power plant 10 and the attachment pylon 14 comprises lateral link rods 20 which take up the thrust forces generated by the power plant 10, each lateral link rod 20 being connected at a first end by a fastener 22 to the power plant 10 and at a second end by a fastener 22' to the attachment pylon 14.

Some of these fasteners 16, 16', 18, 18', 22, 22' comprise at least one assembly with an articulation spindle connecting a clevis and a ferrule.

One embodiment of an assembly provided at the fastener 18' connecting the power plant 10 and the attachment pylon 14 at the rear of the power plant is shown in FIG. 2.

This assembly comprises a clevis 24 connected to the attachment pylon 14, a ferrule 26 connected to the power plant and an articulation spindle 28 connecting the clevis 24 and the ferrule 26.

The clevis 24 comprises two arms 30, 30', each comprising an inner face 301, 301' and an outer face 30E, 30E', wherein the inner faces 301 and 301' face each other.

Each arm 30, 30' comprises a bore 32, 32' into which is inserted a sleeve 34, 34', the two sleeves 34, 34' being coaxial and aligned and having equal internal diameters.

In the following, the longitudinal direction corresponds to the direction of the axes of the sleeves 34, 34'.

Each sleeve 34, 34' comprises an outer shoulder 36, 36' which presses against the inner face 301, 301' of the arm into which it is inserted, so as to limit the movement in translation of said sleeves 34, 34' in the longitudinal direction.

The ferrule 26 comprises a swivel bearing 38 with a bore 40 whose diameter is substantially equal to the internal diameter of the sleeves 34, 34'.

The articulation spindle 28 comprises a hollow cylindrical body whose outer diameter is substantially equal to the internal diameter of the sleeves 34, 34' and the diameter of the bore 40 of the swivel bearing 38.

In order to avoid the articulation spindle 28 coming out of the sleeves and the fastener coming apart, the assembly comprises a blocking device for immobilizing the articulation spindle in translation in the longitudinal direction.

According to a first embodiment shown in FIG. 2, the blocking device comprises:

a bolt 42 with a rod 44 housed in the articulation spindle 28, a head 46 at a first end of the rod and a threaded portion 48 at a second end of the rod, a self-locking nut 50 which is screwed onto the threaded portion 48 of the bolt 42, a first washer 52 which is interposed between the head 46 of the bolt and the articulation spindle 28 and whose outer diameter is greater than the outer diameter of the articulation spindle, a second washer 54 which is interposed between the nut 50 and the articulation spindle 28 and whose outer diameter is greater than the outer diameter of the articulation spindle, a pin 56 which passes through the nut 50 and the rod 44 of the bolt so as to immobilize the nut 50 with respect to the bolt 42.

According to this embodiment, the self-locking nut 50 corresponds to a first anti-rotation system and the pin 56 corresponds to a second anti-rotation system.

During assembly, the bolt 42 is introduced from a first end of the articulation spindle 28 whereas the nut 50 and the pin 56 are maneuvered from a second end of the articulation spindle. As a consequence, this first embodiment requires free space on both sides of the clevis 24.

In order to remedy this drawback, and to allow assembly from just one side of the clevis, a second embodiment shown in FIG. 3 has been developed.

This embodiment is more particularly suited to fasteners 18 located at the front of the power plant 10.

Those elements which are in common with the first embodiment are referenced in the same manner.

According to this second embodiment, the sleeve 34 of the first arm 30 of the clevis 24 comprises at a first end an outer shoulder 36 which projects out from the sleeve and which bears against the inner face 301 of the first arm 30 and at a second end an inner shoulder 58 which projects into the sleeve and which acts as a stop against which a first end of the articulation spindle 28 comes to bear in order to limit the movement thereof in translation in the longitudinal direction in a first sense indicated by the arrow 60 in FIG. 3.

The sleeve 34' of the second arm 30' of the clevis 24 comprises at a first end an outer shoulder 36' which projects out from the sleeve and which bears against the inner face 301' of the second arm 30' and at a second end an extension 62 which extends beyond the outer face 30E' of the second arm 30' and which comprises a tapped bore 64 whose diameter is greater than the internal diameter of the sleeve 34'.

According to this second embodiment, a blocking device makes it possible to limit the movement in translation of the articulation spindle 28 in the longitudinal direction in a second sense indicated by the arrow 66 in FIG. 3. The blocking device comprises:

a first headless screw 68 which is screwed into the tapped bore 64, at least one elastic washer 70 interposed between the second end of the articulation spindle 28 and the first headless screw 68, a second headless screw 72 which is screwed into the tapped bore 64 and presses against the first headless screw 68 at the opposite of the elastic washer(s) 70, a flexible or rigid longilinear element 74 which passes through the extension 62 and the second headless screw 72 so as to immobilize said second headless screw 72 in rotation with respect to the extension 62.

The longilinear element 74 corresponds to a first anti-rotation system and mounting the first headless screw 68 between at least one elastic washer 70 and a second headless screw 72 corresponds to a second anti-rotation system.

This second embodiment has the advantage that it is possible to carry out the assembly from just one side of the clevis.

However, installing the headless screws 68 and 72 inside the tapped bore 64 is not easy and requires the use of tools. This installation is even more difficult when the articulation spindles are of smaller diameter. Indeed, in this case, it is necessary to exert a relatively large torque given the small diameter of the headless screws in order to compress the elastic washer(s) and obtain the second anti-rotation system.

The present invention aims to remedy the drawbacks of the prior art.

SUMMARY OF THE INVENTION

To that end, the invention relates to an assembly having an articulation spindle mounted in a first sleeve inserted into a first arm of a clevis and in a second sleeve inserted into a second arm of said clevis.

The articulation spindle is immobilized in translation by an inner shoulder of the first sleeve which acts as a stop for a first end of said articulation spindle, and by a blocking device which acts as a stop for a second end of said articulation spindle.

According to the invention, the assembly is characterized in that the blocking device comprises:
- a nut which is screwed onto a threaded portion of an extension of the second sleeve and which comprises an inner shoulder which acts as a stop for the second end of the articulation spindle,
- at least two locking washers, each locking washer comprising an orifice having shapes complementary with those of the nut so as to allow the locking washer to move in translation on the nut and prevent a relative rotational movement between the locking washer and the nut,
- a tab washer comprising an orifice such that said tab washer is arranged about the extension of the second sleeve, the washer further comprising an element to immobilize it in rotation with respect to the second arm of the clevis,
- for each locking washer, a blocking element which is able to adopt a first locked state, in which the blocking element limits the rotational movement of the locking washer with respect to the tab washer, and a second unlocked state, in which the blocking element does not impede the rotational movement of the locking washer with respect to the tab washer.

According to this configuration, the nut is always accessible and has a large screwing diameter, which facilitates its installation, in contrast with a headless screw.

According to one embodiment, the nut comprises an outer surface having a first portion and a second portion, said second portion being of hexagonal cross section, the orifice of each locking washer having a 24-sided polygonal perimeter.

Advantageously, the first portion of the nut comprises an outer shoulder against which the locking washers are clamped in the locked state.

According to one embodiment, each locking washer comprises a tab which extends in the same plane as the locking washer, in a radial direction towards the outside of said locking washer, each tab comprising an end remote from the orifice.

According to one embodiment, the tab washer comprises at least two tabs, one for each locking washer, each tab comprising an end and at least one fold such that its end is arranged in a transverse plane, approximately coplanar with an outer shoulder of the nut which acts as a stop for the locking washers.

Advantageously, the end of the tab of each locking washer comprises at least one through orifice and the end of each tab of the tab washer comprises at least one through hole, for each pair comprising a tab of the tab washer and a locking washer, a blocking element which passes through both the through orifice of the locking washer and the through hole of the tab of the tab washer.

For preference, the through orifices of the tabs of the locking washers have oblong shapes with a curved central portion so as to allow a slight angular movement of the nut and so as facilitate the placement of the blocking element.

According to another feature, the element that immobilizes the tab washer in rotation with respect to the second arm of the clevis comprises at least one lug which is secured to said tab washer, with one end able to be folded against an edge of the second arm of the clevis.

The present application also relates to an aircraft comprising an assembly according to the invention for connecting a power plant to a wing.

BRIEF DESCRIPTION OF THE DRAWINGS

Other characteristics and advantages will emerge from the ensuing description of the invention, description given solely by way of example, with regard to the appended drawings in which:

FIG. 4 is a section through an assembly having an articulation spindle which illustrates an embodiment of the invention, FIG. 5 is a section through the assembly shown in FIG. 4, during installation, after the introduction of the articulation spindle, FIG. 6 is a section through the assembly shown in FIG. 4, during installation, after the placement of a tab washer.

DETAILED DESCRIPTION OF THE PREFERRED EMBODIMENTS

Figure 1:
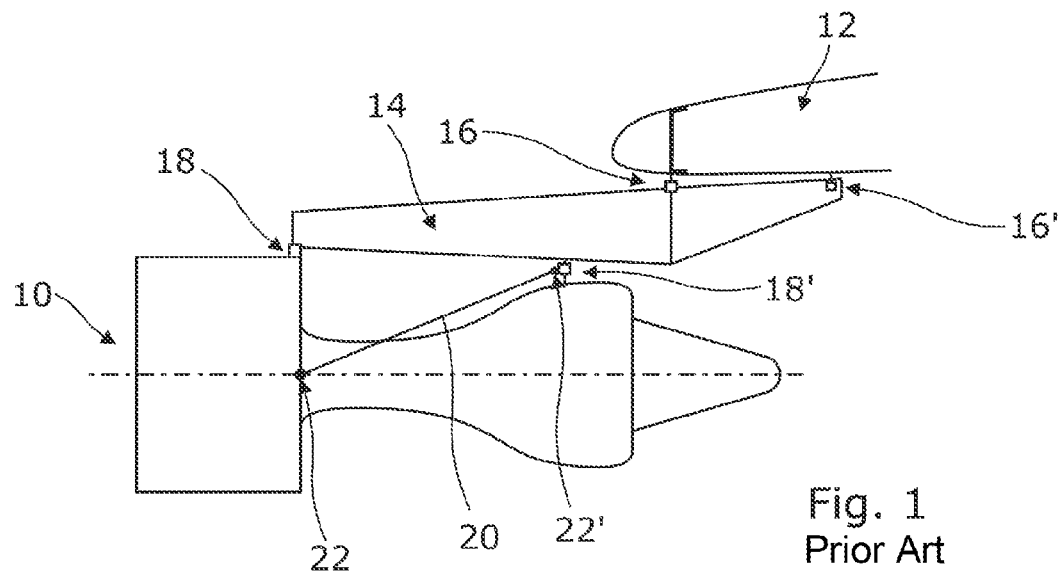
FIG. 1 is a schematic representation of a connection between a power plant and a wing of an aircraft.
Figure 2:
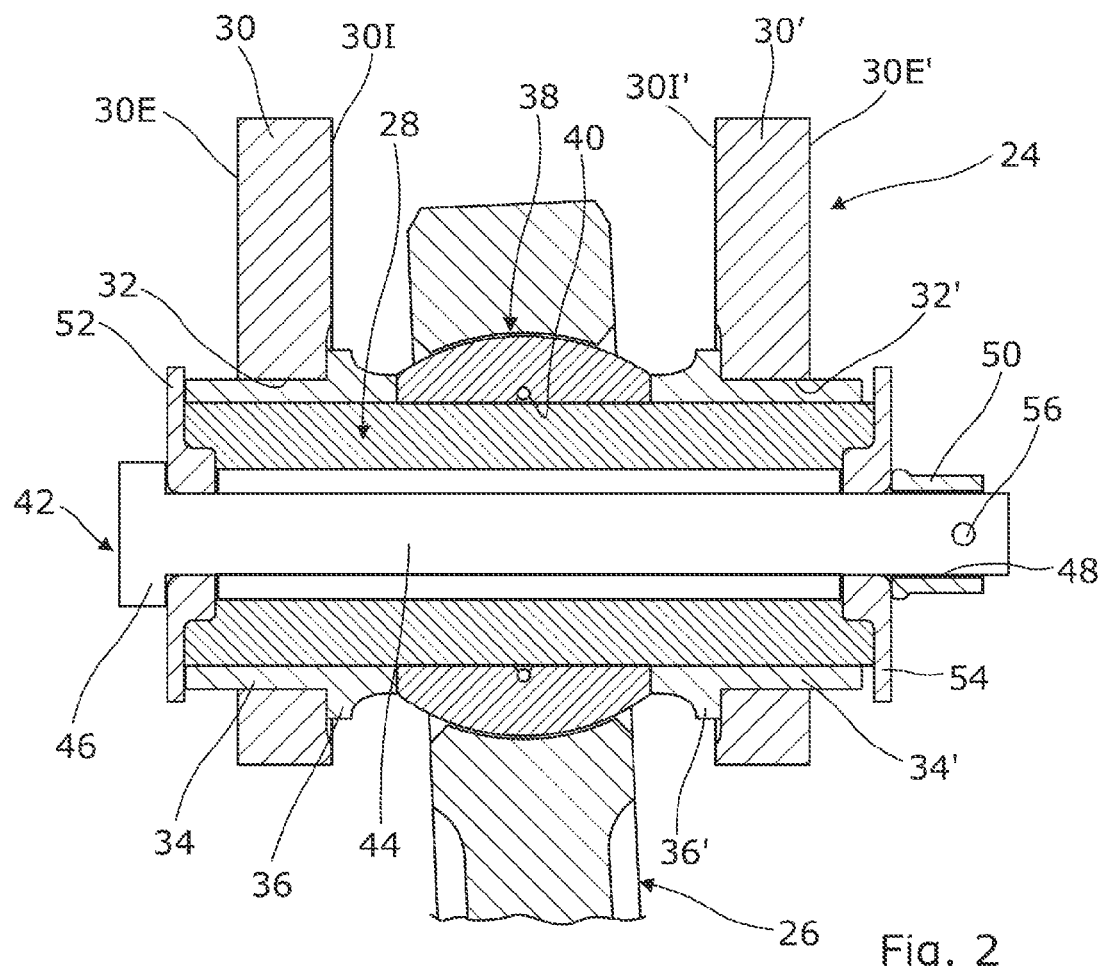
FIG. 2 is a section through an assembly having an articulation spindle which illustrates a first embodiment of the prior art.
Figure 3:
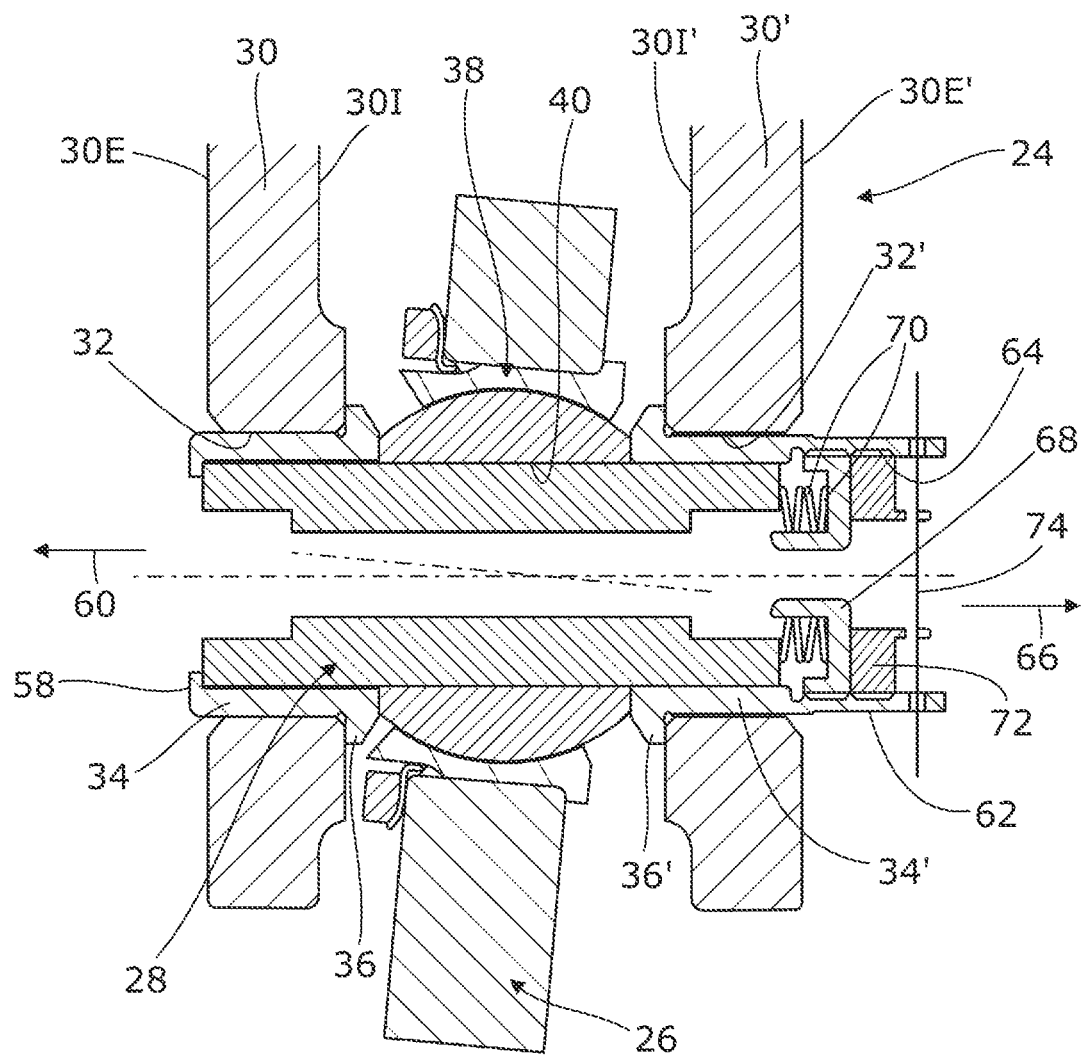
FIG. 3 is a section through an assembly having an articulation spindle which illustrates a second embodiment of the prior art.

FIG. 4 shows an assembly connecting an attachment pylon and a power plant of an aircraft.

This assembly comprises a clevis 80 secured to the attachment pylon, a ferrule 82 secured to the power plant and an articulation spindle 84 connecting the clevis 80 and the ferrule 82.

Of course, the invention is not limited to this application. It may be used for the other fasteners between the wing/the attachment pylon and the attachment pylon/the engine.

The clevis 80 comprises a first arm 86 and a second arm 86', each comprising an inner face 86I, 86I' and an outer face 86E, 86E', wherein the inner faces 86I and 86I' face each other.

The assembly comprises a first sleeve 88 supported by the first arm 86 and a second sleeve 88' supported by the second arm 86', the first and second sleeves 88, 88' being coaxial and aligned and having substantially equal internal diameters.

In the rest of the description, the longitudinal direction corresponds to the direction of the axes of the sleeves 88, 88'. The longitudinal axis of the assembly coincides with the axes of the sleeves 88, 88'. A transverse plane is perpendicular to the longitudinal direction.

According to one embodiment, the first arm 86 comprises a first through hole 90 which opens at the inner face 861 and outer face 86E of said first arm and into which is inserted the first sleeve 88. In parallel, the second arm 86' comprises a second through hole 90' which opens at the inner face 861' and outer face 86E' of said second arm 86' and into which is inserted the second sleeve 88'. The outer diameter of the first sleeve 88 is substantially greater than the diameter of the first through hole 90, making an interference fit possible. The outer diameter of the second sleeve 88' is substantially greater than the diameter of the second through hole 90', making an interference fit possible. By virtue of the interference fits, the sleeves 88, 88' are fixed with respect to the arms 86, 86'.

The ferrule 82 comprises a bearing 92 with a cylindrical bearing surface 94 whose diameter is substantially equal to the internal diameters of the sleeves 88, 88'. The bearing 92 is preferably a swivel bearing.

The articulation spindle 84 comprises a solid or hollow cylindrical body whose outer diameter is substantially equal to the internal diameters of the sleeves 88, 88' and the diameter of the cylindrical bearing surface 94 of the bearing of the ferrule.

The first sleeve 88 of the first arm 86 comprises at a first end an outer shoulder 96 which projects out from the first sleeve and which bears against the inner face 861 of the first arm 86 and at a second end an inner shoulder 98 which projects into the sleeve and which acts as a stop for a first end 100 (shown in FIG. 5) of the articulation spindle 84 when it is installed.

The second sleeve 88' of the second arm 86' comprises at a first end an outer shoulder 96' which projects out from the second sleeve and which bears against the inner face 861' of the second arm 86' and at a second end an extension 102 in the form of a hollow cylinder which extends beyond the outer face 86E' of the second arm 86' and which ends in a circumferential rim 104 arranged in a transverse plane.

The outer diameter of this extension 102 is substantially equal to, or slightly smaller than, the outer diameter of the rest of the second sleeve 88'.

The extension 102 comprises an internal diameter which is substantially equal to the internal diameter of the rest of the second sleeve 88'.

The extension 102 comprises, at its outer surface, at least one threaded portion 106. This threaded portion 106 preferably extends over the entire length of the extension 102.

The articulation spindle 84 is immobilized in translation in the longitudinal direction by means of:

the inner shoulder 98 of the first sleeve 88 which limits the movement of the articulation spindle 84 in the sleeves 88, 88', in the sense of introduction (labelled 108 in FIG. 5), and a blocking device 110 which limits the movement of the articulation spindle 84 in the sense of withdrawing said articulation spindle.

According to one embodiment of the invention, the blocking device 110 comprises:

a nut 112 which is screwed onto the threaded portion 106 of the extension 102 and which comprises an inner shoulder 114 which acts as a stop for a second end 116 of the articulation spindle, a tab washer 118 comprising an element to immobilize it in rotation with respect to the second arm 86' of the clevis, at least two locking washers 120, 120' (shown in FIGS. 8 and 9), each comprising an orifice 138, 138' (shown in FIG. 8) with shapes complementary with those of the nut 112 so as to allow the locking washer 120, 120' to move in translation on the nut 112 and so as to prevent a relative rotational movement between the locking washer 120, 120' and the nut 112, for each locking washer 120, 120', a blocking element which is able to adopt a first locked state, in which the blocking element limits the rotational movement of the locking washer 120, 120' with respect to the tab washer 118, and a second unlocked state, in which the blocking element does not impede the rotational movement of the locking washer 120, 120' with respect to the tab washer 118.

According to one embodiment shown in FIG. 4, the nut 112 comprises an approximately cylindrical body which extends from a front face 122 oriented towards the second arm 86' of the clevis to a rear face 124.

The nut 112 comprises a through passage 126 which extends between the front face 122 and the rear face 124 and which comprises:

a first, tapped portion 128 which extends from the front face 122 and whose diameter and pitch match those of the threaded portion 106 of the extension 102, a second, smooth portion 130 which extends from said first portion 128 to the rear face 124, the diameter of said second portion being smaller than that of the first portion 128.

Given this difference in diameters, the first portion 128 and the second portion 130 are separated by a surface which extends in a transverse plane and which forms the inner shoulder 114.

Figure 7:
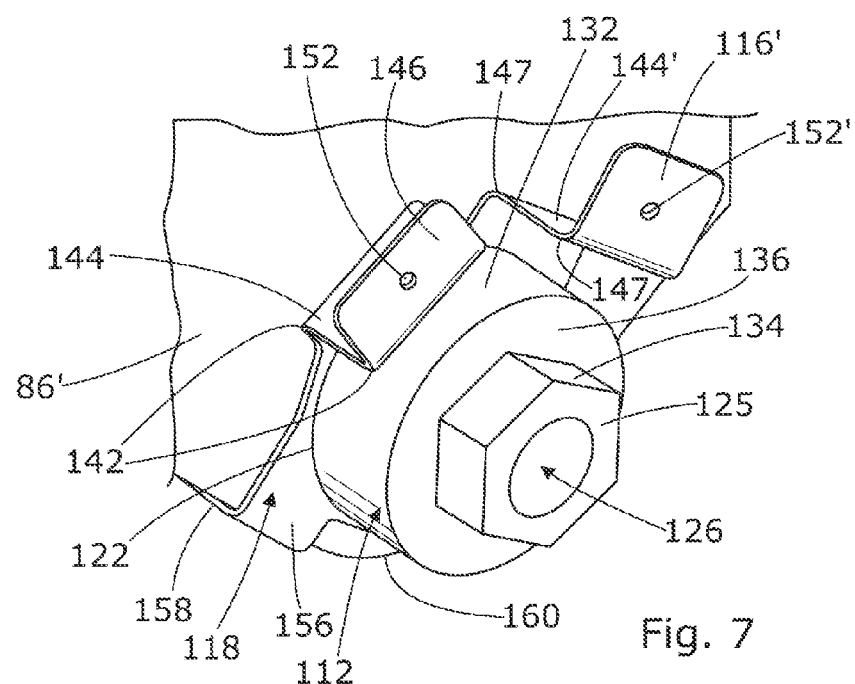
FIG. 7 is a section through the assembly shown in FIG. 4, during installation, after the placement of a nut.

As shown in FIG. 7, the nut 112 comprises an outer surface whose shapes are adapted so as to allow the nut to be screwed. This outer surface is accessible and allows easy, tool-free placement of the nut 112.

The outer surface preferably comprises:

a first portion 132 which extends from the front face 122, a second portion 134 which extends from the first portion 132 to the rear face 124, the cross section of said second section 134 being smaller than that of the first portion 132.

Given this difference in cross sections, the first portion 132 and the second portion 134 are separated by a surface which extends in a transverse plane and which forms an outer shoulder 136.

The first portion 132 has a cylindrical cross section.

The second portion 134 has a non-cylindrical cross section which comprises at least one straight segment. For preference, the second portion 134 has a polygonal cross section. According to one embodiment, the second portion 134 has a hexagonal cross section.

The locking washers 120, 120' are preferably identical. Each one constitutes an anti-rotation system.

Figure 8:
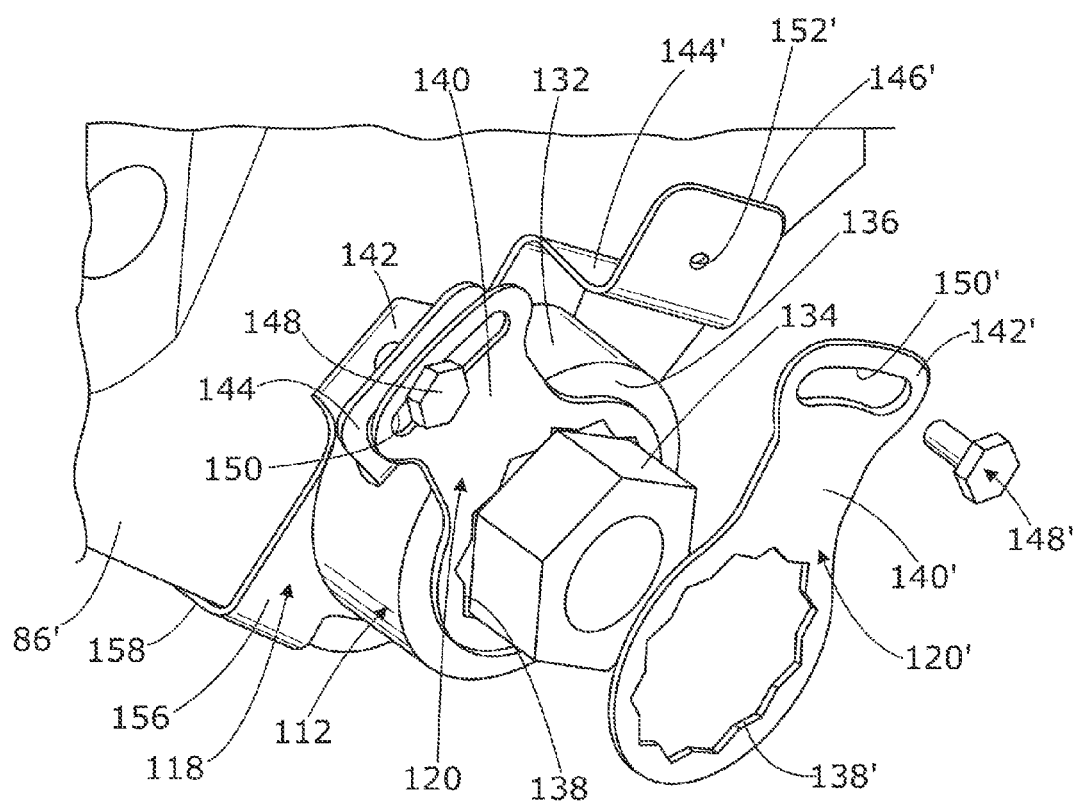
FIG. 8 is a section through the assembly shown in FIG. 4, during installation, during placement of the locking washers.
Figure 9:
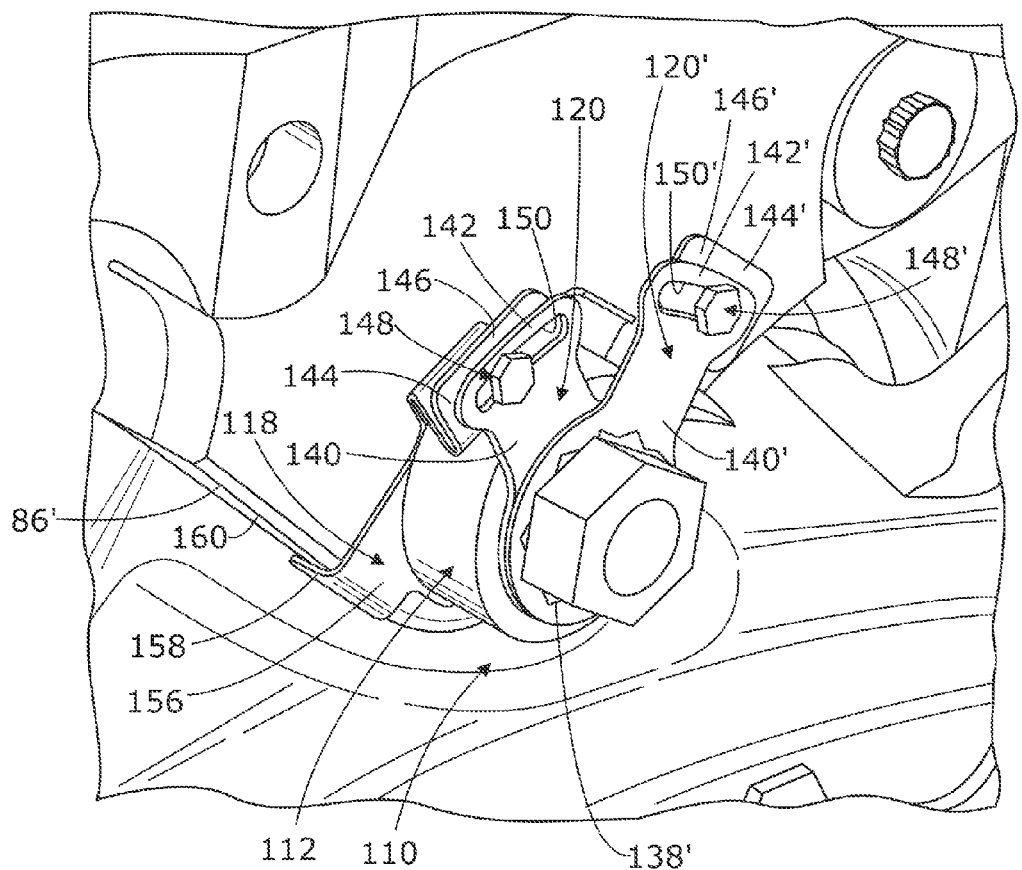
FIG. 9 is a perspective view of one portion of the assembly shown in FIG. 4, in the installed state.

As shown in FIGS. 8 and 9, a locking washer 120, 120' comprises an orifice 138, 138' with shapes which are complementary with those of the second portion 134 of the nut 112 so as to allow the locking washer 120, 120' to move in translation on the second portion 134 of the nut 112 and so as to prevent a relative rotational movement between the locking washer 120, 120' and the nut 112.

According to one embodiment, the orifice 138, 138' of the locking washer 120, 120' has a hexagonal perimeter. According to one embodiment shown in FIG. 8, the orifice 138, 138' has a 24-sided polygonal perimeter by means of which it is possible to immobilize the locking washer 120, 120' in several positions about the nut 112. This solution makes it possible to adjust the relative position of the locking washer 120, 120' with respect to the nut.

In the locked state, as shown in FIG. 9, the locking washers 120, 120' are slotted onto the second portion 134 of the nut 112 and are clamped against one another, one of them being clamped against the outer shoulder 136 of the nut 112.

Each locking washer 120, 120' comprises a tab 140, 140' which extends in the same plane as the locking washer, in a radial direction towards the outside of said locking washer. Each tab 140, 140' comprises an end 142, 142' which is remote from the orifice 138, 138'.

According to one embodiment, the tab washer 118 comprises a tab 144, 144' for each locking washer 120, 120', each tab 144, 144' comprising an end 146, 146'.

For each pair comprising a locking washer and a tab of the tab washer, a blocking element comprises a connection 148, 148' which is preferably removable.

Thus, the tab 140 of the locking washer 120 is connected, by means of the connection 148, to the tab 144 of the tab washer 118 while the tab 140' of the locking washer 120' is connected, by means of the connection 148', to the tab 144' of the tab washer 118.

Each tab 144, 144' comprises at least one fold 147, preferably several folds 147 (shown in FIG. 7), such that its end 146, 146' is arranged in a transverse plane which is approximately coplanar with the outer shoulder 136 of the nut 112.

The tabs 140, 140', 144, 144' are flexible enough to allow their ends 142, 142', 146, 146' to be clamped against one another.

According to one embodiment, each connection 148, 148' takes the form of a through element such as a bolt, a screw, a pin, a cable, etc.

In order that the connection 148, 148' can be installed, each end 142, 142' comprises at least one through orifice 150, 150' and each end 146, 146' comprises at least one through hole 152, 152'.

According to one embodiment, the through holes and the through orifices are circular and their diameters match that of the connection 148, 148'.

According to a preferred embodiment, the through holes 152, 152' of the tabs of the tab washer 118 are circular and their diameters match that of the connection 148, 148' while the through orifices 150, 150' of the tabs of the locking washers 120, 120' are of oblong shape, each having a curved central part which is centered with respect to the longitudinal axis of the assembly. This solution simplifies the placement of the connections 148, 148' and allows a slight angular movement of the nut 112.

As a variant, the through orifices 150, 150' of the tabs of the locking washers 120, 120' are circular, while the through holes 152, 152' of the tabs of the tab washer 118 are of oblong shape, each having a curved central part which is centered with respect to the longitudinal axis of the assembly.

The tab washer 118 comprises an orifice 154 (shown in FIG. 6) whose diameter is slightly greater than that of the extension 102 such that the tab washer is arranged about the extension 102 and is immobilized against the nut 112 and the second arm 86' of the clevis.

Advantageously, the element to immobilize the tab washer 118 in rotation with respect to the second arm 86' of the clevis comprises at least one lug 156 which is secured to the tab washer 118, with an end 158 able to be folded against an edge 160 of the second arm 86' of the clevis as shown in FIG. 6. The tab washer 118 preferably comprises two lugs 156, 156', each having an end 158, 158' able to be folded against the edge 160 of the second arm 86' of the clevis.

According to one embodiment, the lugs 156, 156' and the tab washer 118 are produced as a single part.

In order to produce the assembly, the sleeves 88, 88' are inserted into the arms 86, 86' of the clevis 80 from the inside of the arms. The ferrule 82 is then introduced between the arms 86, 86' until the axis of the bearing 92 of the ferrule 82 is aligned with the axes of the sleeves 88, 88'. The articulation spindle 84 is introduced into the sleeves 88, 88' and the bearing 92 from a first side of the clevis 80, until the first end 100 of the articulation spindle 84 bears against the inner shoulder 98 of the first sleeve as shown in FIG. 5.

Then, the tab washer 118 is slotted onto the extension until it comes to bear against the second arm 86' of the clevis 80. The ends 158, 158' of the lugs 156, 156' are folded against the edge 160 of the second arm 86', so as to immobilize the tab washer 118 in rotation, as shown in FIG. 6. The nut 112 is then screwed until it clamps the tab washer 118 against the second arm 86' of the clevis, as shown in FIG. 7.

Then, the locking washers 120, 120' are installed and connected to the tab washer 118 by means of the connections 148, 148', one after another, as shown in FIG. 8.

The advantages of the assembly according to the invention are as follows:

this assembly makes it possible to introduce the articulation spindle and to block it in translation from just one side of the clevis. It is thus possible to arrange the devises of the engine/attachment pylon fasteners so as to allow introduction from one side of the nacelle in the case of a nacelle configuration having a small ground clearance, this assembly makes it possible to simplify the installation of the blocking device with a double anti-rotation system and to limit the use of tools this assembly requires no modification to the clevis or the ferrule.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft engine mounting assembly carrying an aircraft engine comprising:
a clevis with a first arm and a second arm,
a first sleeve and a second sleeve,
an articulation spindle mounted in the first sleeve inserted into the first arm of the clevis and in the second sleeve inserted into the second arm of said clevis,
said first sleeve comprising an inner shoulder projecting into said first sleeve and acting as a stop for a first end of said articulation spindle,
a blocking device acting as a stop for a second end of said articulation spindle,
the blocking device comprising:
a nut screwed onto a threaded portion of an extension of the second sleeve, the nut comprising an inner shoulder acting as a stop for the second end of the articulation spindle,
at least two locking washers, each locking washer comprising an orifice having shapes complementary with those of the nut allowing the locking washer to move in translation on the nut and preventing a relative rotational movement between the locking washer and the nut,
a tab washer comprising an orifice such that said tab washer is arranged about the extension of the second sleeve, the tab washer further comprising an element immobilizing it in rotation with respect to the second arm of the clevis, for each locking washer, a blocking element configured to adopt a first locked state, in which the blocking element limits the rotational movement of the locking washer with respect to the tab washer, and a second unlocked state, in which the blocking element does not impede the rotational movement of the locking washer with respect to the tab washer.

2. The assembly as claimed in claim 1, wherein the nut comprises an outer surface having a first portion and a second portion, said second portion being of hexagonal cross section, the orifice of each locking washer having a 24-sided polygonal perimeter.

3. The assembly as claimed in claim 2, wherein the first portion of the nut comprises an outer shoulder against which the locking washers are clamped in the locked state.

4. The assembly as claimed in claim 1, wherein each locking washer comprises a tab extending in a same plane as the locking washer, in a radial direction towards an outside of said locking washer, each tab comprising an end remote from the orifice.

5. The assembly as claimed in claim 1, wherein the tab washer comprises at least two tabs, one for each locking washer, each tab comprising an end and at least one fold such that its end is arranged in a transverse plane, approximately coplanar with an outer shoulder of the nut which acts as a stop for the locking washers.

6. The assembly as claimed in claim 5, wherein each locking washer comprises a tab extending in a same plane as the locking washer, in a radial direction towards an outside of said locking washer, each tab comprising an end remote from the orifice, and wherein the end of the tab of each locking washer comprises at least one through orifice and wherein the end of each tab of the tab washer comprises at least one through hole, for each pair comprising a tab of the tab washer and a locking washer, a blocking element which passes through both the through orifice of the locking washer and the through hole of the tab of the tab washer.

7. The assembly as claimed in claim 6, wherein the through orifices of the tabs of the locking washers have oblong shapes with a curved central portion so as to allow a slight angular movement of the nut.

8. The assembly as claimed in claim 1, wherein the element to immobilize the tab washer in rotation with respect to the second arm of the clevis comprises at least one lug which is secured to said tab washer, with one end of said lug able to be folded against an edge of the second arm of the clevis.

9. An aircraft comprising:
a power plant,
a wing,
an assembly connecting the power plant to the wing, comprising:
  a clevis with a first arm and a second arm,
  a first sleeve and a second sleeve,
  an articulation spindle mounted in the first sleeve inserted into the first arm of the clevis and in the second sleeve inserted into the second arm of said clevis,
  said first sleeve comprising an inner shoulder projecting into said first sleeve and acting as a stop for a first end of said articulation spindle,
  a blocking device acting as a stop for a second end of said articulation spindle,
  the blocking device comprising:
a nut screwed onto a threaded portion of an extension of the second sleeve, the nut comprising an inner shoulder acting as a stop for the second end of the articulation spindle,
at least two locking washers, each locking washer comprising an orifice having shapes complementary with those of the nut allowing the locking washer to move in translation on the nut and preventing a relative rotational movement between the locking washer and the nut,
a tab washer comprising an orifice such that said tab washer is arranged about the extension of the second sleeve, the tab washer further comprising an element immobilizing it in rotation with respect to the second arm of the clevis,
for each locking washer, a blocking element configured to adopt a first locked state, in which the blocking element limits the rotational movement of the locking washer with respect to the tab washer, and a second unlocked state, in which the blocking element does not impede the rotational movement of the locking washer with respect to the tab washer.

\* \* \* \* \*